Feb. 2, 1943. H. KOTT 2,309,910
VISCOSIMETER
Filed July 15, 1941 2 Sheets-Sheet 2

INVENTOR
Hermann Kott
BY
Hogues Neary + Campbell
ATTORNEYS

Patented Feb. 2, 1943

2,309,910

UNITED STATES PATENT OFFICE 2,309,910

VISCOSIMETER

Hermann Kott, East Orange, N. J., assignor to Speedry Gravure Corporation, New York, N. Y., a corporation of New York Application July 15, 1941, Serial No. 402,472

5 Claims. (Cl. 265—11)

The present invention relates to viscosity measuring and controlling devices and, more particularly, to devices for determining the viscosity of a flowing liquid and controlling the proportions of the ingredients thereof.

In the preparation of printing inks, for example, the coloring material is mixed with one or more solvents to dilute and render the mixture suitable for application by the printing rolls. Variation in the amount of solvent in the ink will vary its viscosity and the ease of application to and drying of the ink on the paper web. Inasmuch as large volumes of ink are used in high speed presses and the ink must be continually prepared and supplied, it is difficult to obtain uniformity in the viscosity of the ink unless some means is provided for determining continuously the viscosity of the ink. Because of the variations in the viscosity and other characteristics of the ink, variations in the appearance of the printed matter may occur from time to time. Such variations in appearance can be overcome to a large extent by maintaining the proportions of the solvent and the coloring matter constant.

An object of the invention, therefore, is to provide an improved mechanism by means of which the viscosity of the printing ink may be measured or utilized as a force to control the solvent supplied to the ink fountain.

Inasmuch as the solvents used in printing inks, particularly for high speed presses, are usually volatile in order to promote quick drying, difficulty is encountered in maintaining accurate operation of viscosity measuring devices, for the reason that the ink dries in the device, if allowed to stand therein, and thereby clogs the passages of the device.

Another object of the invention, therefore, is to provide a viscosity measuring device which is self-draining, thereby preventing the accumulation of gummy coloring matter in the device with resulting loss of accuracy.

Further objects of the invention will be apparent as it is described in greater detail in connection with the accompanying drawings, wherein.

Figure 1:
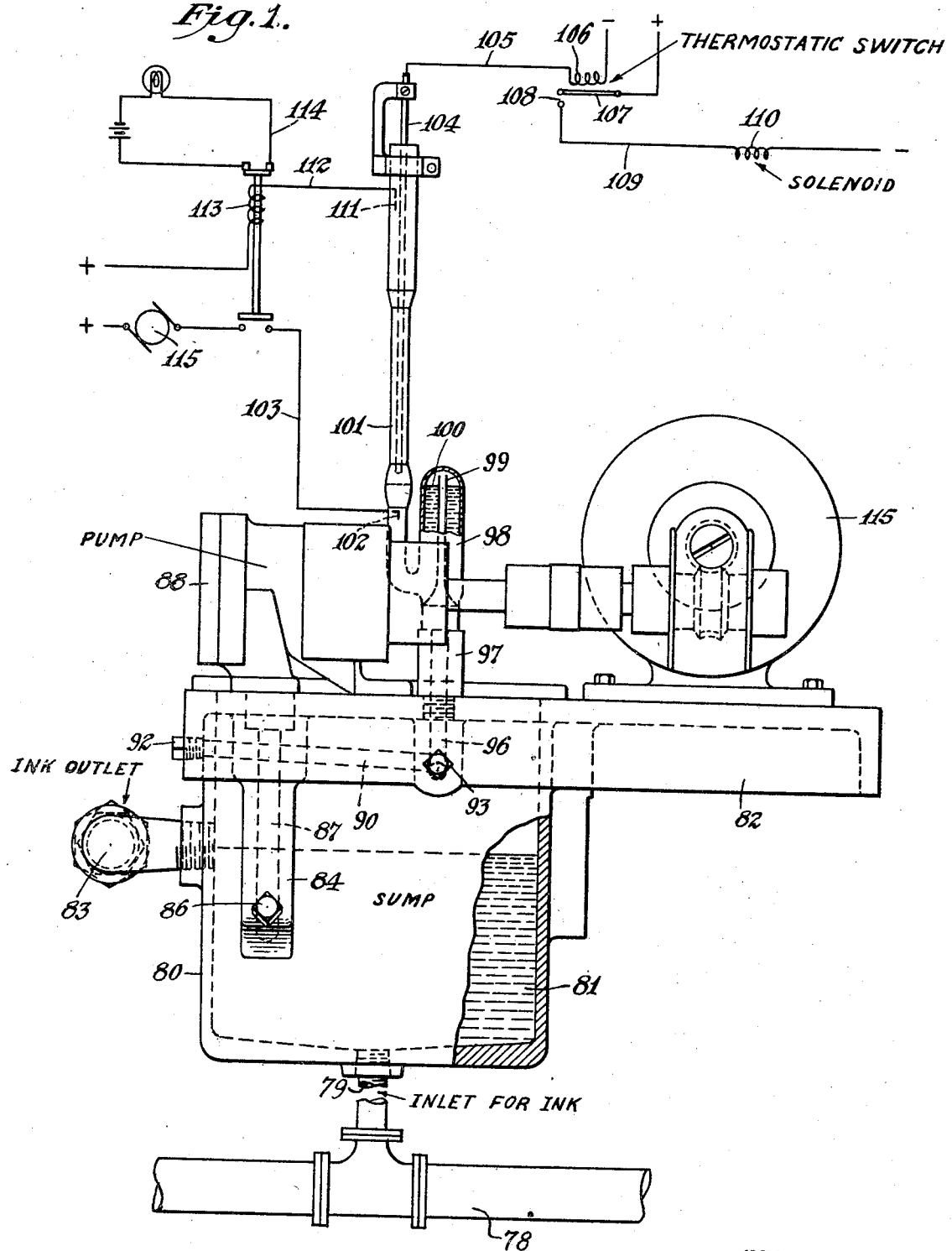
Fig. 1 is a view in end elevation, partly broken away and in section, showing the viscosity controlling mechanism.
Figure 2:
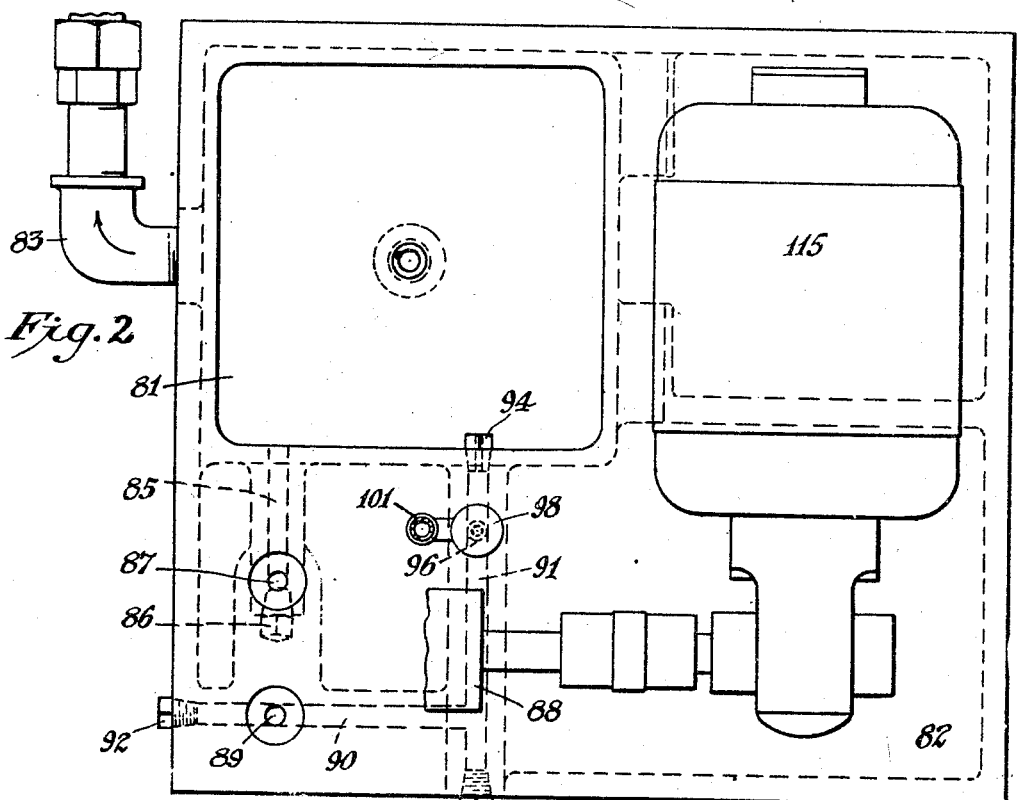
Fig. 2 is a plan view of the mechanism shown in Fig. 1.
Figure 3:
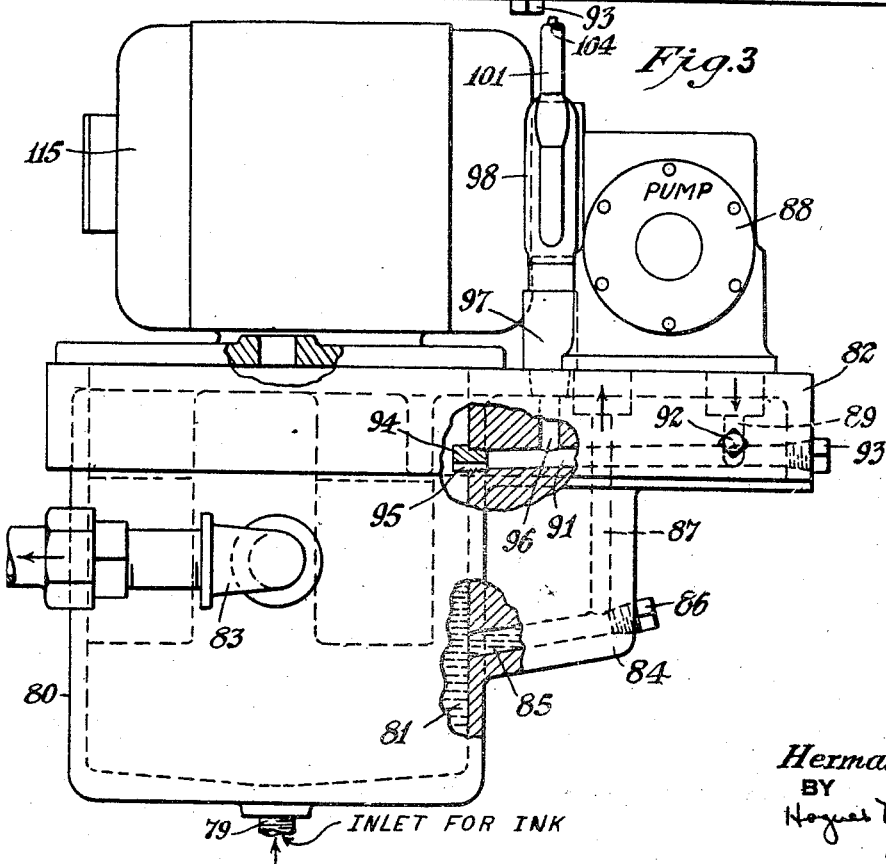
Fig. 3 is a view in end elevation, partly broken away and in section, showing the mechanism of Fig. 1.

A typical form of device for measuring the viscosity and controlling the flow of solvent embodying the present invention is illustrated in Figures 1 to 3 of the drawings. In this device a pump supplies ink continually from the pipe 78 to a connection 79 (Figs. 1 and 3), the connection 79 being mounted upon a receptacle 80 that forms a sump 81. The receptacle is mounted upon a base 82 and is provided with a discharge connection 83 to return the ink to the ink line 78. The ink delivered to the sump 81 is the same as the ing delivered to the ink fountain and, therefore, is constantly characteristic of the ink in the ink fountain. The receptacle or chambered member 80 is formed with a portion 84 that is bored to form a duct 85 that is closed by a tap 86. The duct 85 slopes downwardly in order that it may be self draining. A vertical duct 87 is also formed in the chambered member and communicates between the duct 85 and the inlet or suction side of a pump 88 that is mounted upon the base 82. The discharge side of the pump 88 communicates with a short vertical duct 89 that communicates in turn with a sloping duct 90 and a sloping duct 91 which returns the ink to the sump. Tap 92 closes the duct 90 while tap 93 closes the duct 91.

The outlet of the duct 91 is provided with a fitting 94 that is formed with a restricted aperture 95. The pump thus creates a fluid pressure in the ducts 89, 90 and 91, which pressure varies with the viscosity of the printing ink.

A vertical duct 96 is formed in the base 82 and communicates with a fitting 97, upon which a tube 98 is carried. The tube 98 is formed with a central tube 99 that communicates with the duct 96 and subjects the top of the tube 98 to the pressure within the duct 96. Within the tube 98, there is provided a column of mercury, the level of which is indicated at 100. This mercury flows into a tube 101 which serves as one branch of a U-tube and normally contacts a terminal 102 which is connected to a wire 103, connected to a source of current. The tube 101 is also provided with a vertically adjustable electrode or contact member 104 that is connected to a wire 105 provided with a resistance or heating coil 106. The heating coil 106 acts upon a bi-metallic or other thermal responsive element 107 to provide a time lag in the closing of contacts 108. Contacts 108 are connected in a circuit 109 which includes a solenoid 110 for operating a valve that controls the flow of solvent to the ink.

The tube 101 is also provided with a terminal 111 that is connected by means of a wire 112 to a relay coil 113. When the pressure upon the mercury becomes excessive, as due to an obstruction or other defect, the circuit 112 is closed to energize the solenoid 113 and an alarm circuit 114 and also to disconnect the circuit of a motor 115 which drives the pump 88.

It will be observed that all of the ducts in the chambered member 80 are inclined downwardly so that they are self-draining. In this fashion, they do not easily become clogged and if an obstruction occurs, they are readily cleaned by removing the various taps that seal the ducts from the atmosphere.

The motor 115 may be suitably connected in any desired fashion to drive the pump 88 and the viscosity responsive mechanism above described not only provides an automatic cut-off to prevent injury to the system but prevents temporary changes in viscosity from operating the solvent supply valve by means of the thermal switch 107. This prevents excessive fluctuation where viscosity changes are only of an extremely limited nature.

While the invention has been described with specific reference to the accompanying drawings, it is not to be limited save as defined in the appended claims.

I claim:

1. A viscosity measuring device comprising means forming a mercury column, a chambered member formed with a sump, a pump mounted on the chambered member, a first self-draining duct in the member connecting the pump with the sump, a second self-draining duct between the pump and the sump, said second duct having a restriction therein, means to mount the mercury column on the chambered member, a third self-draining duct in the mounting means and forming a communication between the second duct and the mercury column, and removable closures on the said member for gaining access to the said ducts.

2. A viscosity measuring device comprising a member having a sump for receiving a liquid, a pump on said member, means forming a conduit connecting said pump and said sump to permit liquid to be withdrawn from said sump, said conduit being inclined downwardly from said pump to said sump, means forming a second conduit connecting said pump with said sump for returning said liquid to said sump, said second conduit being inclined downwardly from said pump to said sump, means forming a restriction in said second conduit for resisting flow of said liquid from said pump to said sump to create a back pressure in said second conduit proportional to the viscosity of said liquid, an elongated gauge on said member above said sump having a column of mercury therein and means forming a third conduit connected to said second conduit at a point between said pump and said restriction and extending upwardly to and connected with said chamber for rendering the height of the column of mercury responsive to variations in the back pressure in said second conduit, the inclinations of said conduits rendering them self-draining upon stoppage of said pump.

3. In a viscosity measuring device the combination of a hollow member having walls, a top and a bottom forming a sump for receiving a liquid, a pump having an inlet and an outlet on the top of said member, a gauge having a mercury column therein on the top of said member, a first conduit connecting the inlet of said pump and said sump comprising two intersecting bores in a wall and in the top of said member, one of said bores extending upwardly from said intersection to said inlet and the other extending from the exterior of said member to said sump and being inclined downwardly from said one bore to said sump, a second conduit connecting the outlet of said pump and said sump comprising two intersecting bores in the top and in a wall of said member, one of said bores of said second conduit extending upwardly to said outlet and the other being inclined downwardly from the lower end of said one bore to said sump and extending from the exterior of said member to said sump, said downwardly inclined bore of said second conduit having a restriction therein, a third conduit connecting said gauge with said second conduit between said restriction and the outlet of said pump, comprising a bore in the top of said member extending downwardly from said gauge to said second conduit and removable plugs in the exterior ends of said downwardly inclined bores of said first and second conduits.

4. A viscosity measuring device comprising means forming a mercury column responsive to variations in pressure thereon, a chambered member formed with a sump for receiving a liquid, a pump associated with the chambered member, a first self-draining duct connecting the pump with the sump for withdrawing liquid from said sump, a second self-draining duct between the pump and the sump for returning liquid to said sump, said second duct having a restriction therein, and a third self-draining duct connecting said mercury column to said second duct at a point between said pump and said restriction, whereby variation in the viscosity of said liquid varies the pressure on said mercury column.

5. A viscosity measuring device comprising means forming a mercury column responsive to variations in pressure thereon, a chambered member formed with a sump for receiving a liquid, a pump associated with the chambered member, a first self-draining duct connecting the pump with the sump for withdrawing liquid from said sump, a second self-draining duct between the pump and the sump for returning liquid to said sump, said second duct having a restriction therein, and a third self-draining duct connecting said mercury column to said second duct at a point between said pump and said restriction, whereby variation in the viscosity of said liquid varies the pressure on said mercury column, and removable closures on the said member for gaining access to said ducts.

HERMANN KOTT.